(12) United States Patent
Beesley et al.

(10) Patent No.: US 7,933,971 B2
(45) Date of Patent: Apr. 26, 2011

(54) METHOD FOR SECURE COMMUNICATION OVER A PUBLIC DATA NETWORK VIA A TERMINAL THAT IS ACCESSIBLE TO MULTIPLE USERS

(75) Inventors: Richard Craig Beesley, Romsey (GB); Richard Andrew Bonniface, Ocean Way (GB); Richard Harvey Day, Netley Abbey (GB); Stuart William John Daley, North Baddesley (GB); Baby Vasudevan, Romsey (GB)

(73) Assignee: Roke Manor Research Limited, Romsey (GB)

( * ) Notice: Subject to any disclaimer, the term of this patent is extended or adjusted under 35 U.S.C. 154(b) by 1186 days.

(21) Appl. No.: 10/767,454

(22) Filed: Jan. 30, 2004

(65) Prior Publication Data

US 2005/0021668 A1 Jan. 27, 2005

(30) Foreign Application Priority Data

Jan. 31, 2003 (GB) .................................. 0302263.9

(51) Int. Cl.
*G06F 15/16* (2006.01)
(52) U.S. Cl. .......................... 709/219; 709/220; 709/227
(58) Field of Classification Search .................. 719/219, 719/226, 227; 709/203, 217, 219, 227; 711/213; 707/513, 527; 380/281
See application file for complete search history.

(56) References Cited

U.S. PATENT DOCUMENTS

| | | | |
|---|---|---|---|
| 5,949,348 A | | 9/1999 | Kapp et al. |
| 5,961,593 A * | | 10/1999 | Gabber et al. ................ 709/219 |
| 6,003,077 A * | | 12/1999 | Bawden et al. ............... 709/223 |
| 6,055,566 A * | | 4/2000 | Kikinis ......................... 709/219 |
| 6,070,796 A | | 6/2000 | Sirbu |
| 6,282,553 B1 | | 8/2001 | Flicker et al. |
| 6,330,067 B1 * | | 12/2001 | Murata ........................ 358/1.12 |
| 6,385,641 B1 * | | 5/2002 | Jiang et al. .................... 709/203 |
| 6,415,319 B1 * | | 7/2002 | Ambroziak ................... 709/219 |
| 6,694,431 B1 * | | 2/2004 | Binding et al. ............... 713/160 |
| 6,714,964 B1 * | | 3/2004 | Stewart et al. ................ 709/203 |
| 2002/0191020 A1 | | 12/2002 | Kaply et al. |
| 2003/0076300 A1 | | 4/2003 | Lauper et al. |
| 2003/0191799 A1 * | | 10/2003 | Araujo et al. ................. 709/203 |

FOREIGN PATENT DOCUMENTS

EP 0 647 899 A1 4/1995
(Continued)

OTHER PUBLICATIONS

European Examination Report dated Sep. 21, 2009 (Four (4) pages).

*Primary Examiner* — Khanh Q Dinh
(74) *Attorney, Agent, or Firm* — Crowell & Moring LLP

(57) ABSTRACT

There is described a method of communicating over a public data network, for example the Internet. A user of a public PC, for example one located in an Internet café, uses the Internet browser provided on the public PC to downloaded from a remote trusted web site a secure Internet browser that then runs within the browser provided on the public PC. The user uses the secure Internet browser to browse the Internet. The secure browser has been configured so that no copy of information transmitted into the network or downloaded from the network is cached or otherwise recorded on the hard disc of the terminal. The user may thus browse the Internet without leaving a record of sensitive information (e.g. credit card details) used in the browsing session at the public terminal.

11 Claims, 4 Drawing Sheets

FOREIGN PATENT DOCUMENTS

| | | |
|---|---|---|
| EP | 0855659 A1 | 7/1998 |
| EP | 1033854 A2 | 9/2000 |
| GB | 2 358 336 A | 7/2001 |
| WO | WO 00/48076 A1 | 8/2000 |
| WO | WO 02/071177 A2 | 9/2002 |

* cited by examiner

6 Applet downloaded from server 5

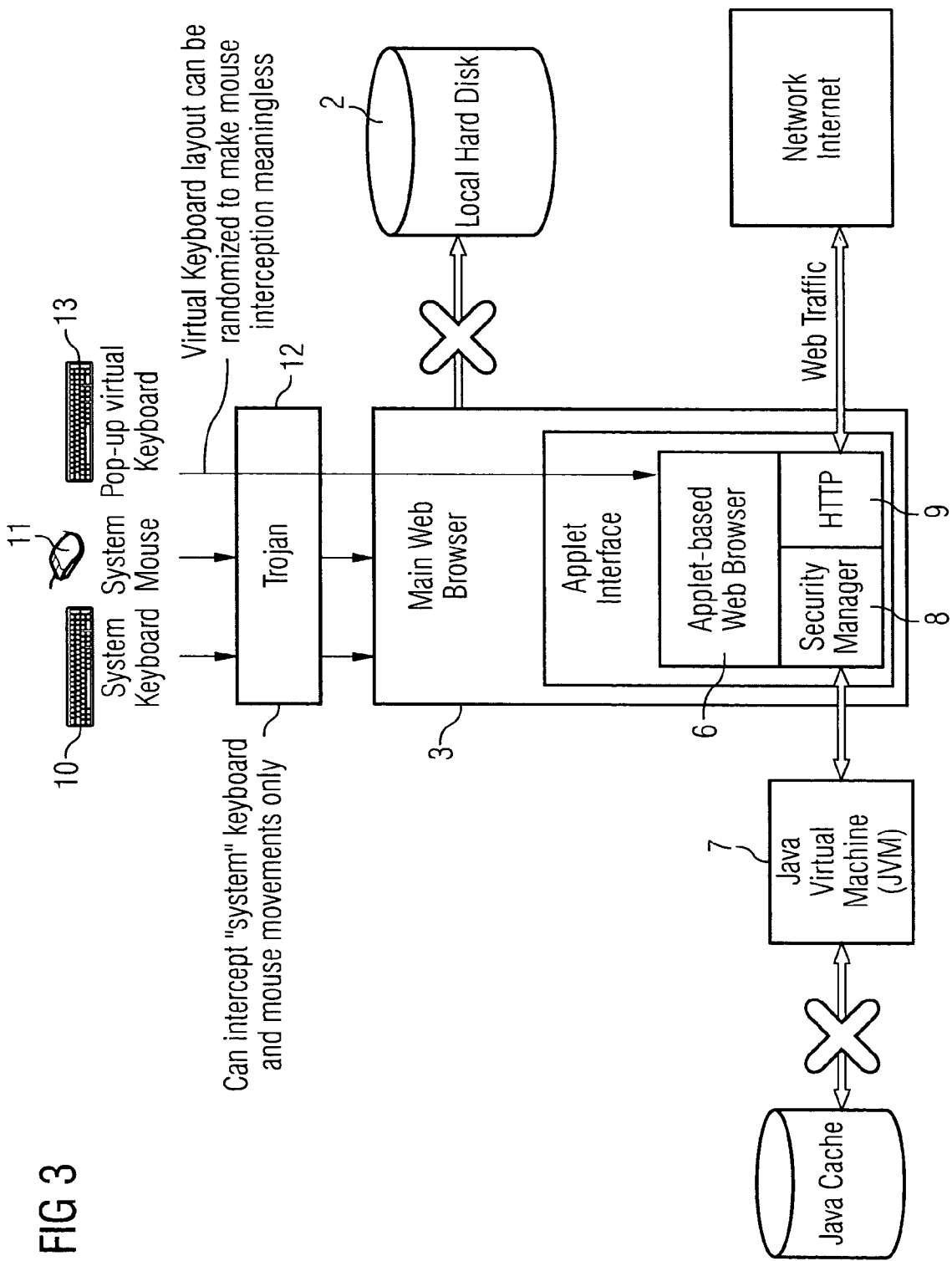

METHOD FOR SECURE COMMUNICATION OVER A PUBLIC DATA NETWORK VIA A TERMINAL THAT IS ACCESSIBLE TO MULTIPLE USERS

This invention relates to a method of communicating over a public data network.

Web pages are viewed using programs known as browsers, of which Microsoft's Internet Explorer is a well known example. A browser fetches a requested page interprets the text and formatting commands that it contains, and displays the page properly formatted on a display. Web pages may contain forms that request the user to enter information for transmission over a connection, for example, to allow a user to order a product or pay a bill.

All web browsers store information relating to web pages a user has visited. This information may include the Uniform Resource Locators (URLs) of the visited web pages, passwords used to access the pages, user names, cookies, cached web pages and other information, all of which is stored on the hard disc of the PC running the browser.

This information is stored primarily to accelerate access to frequently accessed web sites and to streamline a user's interaction with the browser. For example, if a user requests an already cached web page, the browser need only check if the page is still up to date and if it is, the page need not be downloaded again but simply retrieved from the cache. A browser may for example automatically supply to a web server a password previously used by a user to access the web server, to save the user having to input the password again.

The storage of such information facilitates Internet browsing, but there are circumstances in which the stored information may become accessible to unauthorised persons, thus presenting a security and privacy risk. For example, a home PC may change ownership or be stolen from its owner, whilst still having such information stored on its hard drive. Furthermore, many users browse the Internet from shared PCs in the workplace or university, or from public PCs in Internet kiosks or Cafes, hotel business facilities or in airport Lounges and leave such information on the PC's hard drives after their browsing session.

The unauthorised gathering of information such as cookies and passwords from hard drives can lead to the disclosure of private information. For example, commercial secrets, bank account and personal details, details of E-commerce transactions, accounting data (e.g. email passwords, dial-up passwords, web services passwords) and other such sensitive information.

Online banks and similar operations are concerned with securing the web page between the browser and their server, but there is little they can do to prevent interception of information at the browser terminal itself.

Thus the security of a local terminal can be compromised by post browsing analysis of the browser's cache and of the hard disc of the terminal. The security of a local terminal may also be compromised whilst a user is in the process of browsing the Internet, if a previous user had installed one or more Trojans on the terminal.

A Trojan is a programme used by an attacker to enter a victim's computer undetected, granting the attacker unrestricted access to the data stored on that computer. A Trojan can be a hidden program that runs on a computer without the user's knowledge, or it can be 'wrapped' into a legitimate program giving this program hidden functions that the user is not aware of.

Trojans can be used to siphon off confidential information or to create damage. Within a network context, a Trojan is most likely to be used for spying and stealing private and sensitive information A particular example of a dangerous Trojan with regard to web browsing is a keyboard logger.

Key logger software causes every keystroke made on the computer to be recorded. The program can remain completely undetected and is initiated when the computer is turned on. The key logger records everything outgoing to include emails, documents, login names, passwords, and credit card numbers etc. These programs can be installed in the target computer via disc/CD (requires physical access), or remotely through emails with "Trojan" attachments. Often, the program is enabled with a "data dump" function. A "data dump" occurs when captured information is transmitted to a location which was predetermined by the suspect and incorporated into the program to function automatically.

Public Terminals for Internet browsing, such as those located in Internet cafes, are particularly vulnerable to Trojans, because of the ease of opportunity of installing Trojans on such terminals.

Embodiments of the present invention aim to alleviate such problems.

According to the present invention there is provided a method of communicating over a public data network, the method comprising; transmitting to a remote server on the network a request for a communications application stored on the server to be downloaded to a terminal connected to the network; receiving the communications application at the terminal; using the communications application to communicate from the terminal over the public data network; wherein, the communications application is configured such that user input data, input to the communications application by a user of the terminal, is transmitted into the network without a record of the data being stored at the terminal or that data received at the terminal by the communications application from the network at the request of the user is presented to the user without a record of the data being stored at the terminal.

According to the invention there is also provided a method of enabling a user to input data to a terminal, the method comprising: displaying on a terminal display screen a graphical representation of a keypad for the user to select keys of the keypad to effect data input.

According to the invention there is also provided A method of displaying information to a user of a terminal, the method comprising; displaying on a screen of the terminal a display region for displaying information to the user, the display region containing a viewing portion which in response to user input is moveable within the display region to reveal information to the user and wherein information is displayed to the user substantially only in the portion of the display region in which the viewing portion is placed.

The above and further features of the invention are set forth with particularity in the appended claims and together with advantages thereof will become clearer from consideration of the following detailed description of an exemplary embodiment of the invention given with reference to the accompanying drawings.

In the drawings:

FIG. 3 illustrates a system embodying the present invention;

Figure 1:
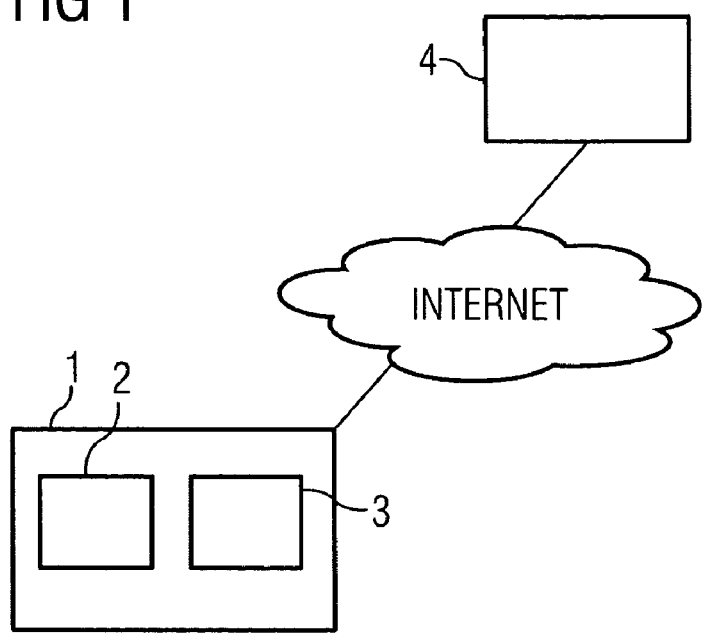
FIG. 1 illustrates a communications network.

A scenario in which residue data from an Internet browsing session is left on a public PC and is then obtained and misused by a fraudster is described with reference to FIG. 1. FIG. 1 illustrates a public PC 1, located for example in an Internet café. The PC 1 comprises a hard disc 2 and is provided with a web browser 3. A legitimate user (not shown) enters the Internet café and is allocated the PC 1 to use. The user wishes to make an online purchase of books and so launches the web browser 3 and types in the Uniform Resource Locator (URL) of the home page of an online book vendor, for example, bookshopontheinternet.com.

The web browser 3 retrieves a bookshopontheinternet.com web page from a remote server 4 and displays the web page on the screen (not shown) of the PC 1. The browser automatically stores the URL in a browser history file on the hard disc 2 and the web page itself, in a browser cache on the hard disc 2. In this scenario, the user has a pre-existing account with bookshopontheInternet.com, and to access this account, the user inputs a registered account username and password to the browser 3 and prompts the browser 3 to transmit this information to the web server 4. The web browser 3 also stores this information on the hard disc 2.

After selecting one or more books for purchase, the user uses the browser 3 to download and display a checkout page, which prompts the user for his or her credit card details to complete the transaction. The user inputs his or her credit card details into a form in the checkout page and causes the browser to transmit this information to the web server 4. Again, the browser 3 automatically stores this information to a file on the hard disc 2.

The user completes his or her web browsing and exits the Internet café leaving the URL's of the visited web pages, the web pages themselves, the user name, password and credit card details all stored on the hard disc 2.

Subsequently, a fraudster enters the Internet café and is allocated the PC 1. The fraudster browses the hard disc 2 and by performing some analysis of the web browser cache and history discovers the websites the user looked at and the user's username and password. The fraudster is thus able to log onto the bookshopontheInternet.com web site and masquerade as the user. The fraudster may for example change the registered mail and email addresses of the user's account and of course may misuse the credit card information by placing book orders.

Because of the performance benefits of caching information, all web browsers have this function enabled by default. The security of public PCs would be improved if users were to disable this function prior to commencing browsing. However, disabling the caching and storing of web browser information is non trivial. It requires knowledge and skill to disable all web browser caching when using a shared terminal. Indeed it is not possible to turn off every data gathering option. For example, Internet Explorer insists on at least a 1 MB web page cache and some of the cache files are shared by Windows hence the operating system 'locks' the files preventing deletion and removal of the information.

Even if a user were to manually delete the contents of the web cache it could still be recovered from the hard disc after deletion. Tools are freely available on the Internet that perform such data recoveries. Even with disabled caching, the operating system may still swap out the contents of the web page displayed in the current web browser process to hard disc leaving a magnetic impression.

Lack of administrator privileges on a shared terminal compounds the problem of either securely configuring the browser and 'tidying up' after yourself. The system administrator may have already hard configured the web browser with little regard for privacy and security and removed access to the web browser files on the hard disc.

There are some software products available that can automatically delete all the information gathered by the web browser, but this would also require administrative rights to install the new software on a shared terminal. Further software installation would be required to scan for Trojans.

In embodiments of the present invention, a user may use a browser running in an un-trusted environment such as a PC in an Internet café, to visit a remote trusted web site and download from the trusted web site a further browser, which is known to the user to have been configured to browse the Internet without caching or otherwise storing data on the hard disc of the PC. Having downloaded the trusted browser the user may use it to browse the Internet with the knowledge that no residue information is left on the public terminal.

Figure 2:
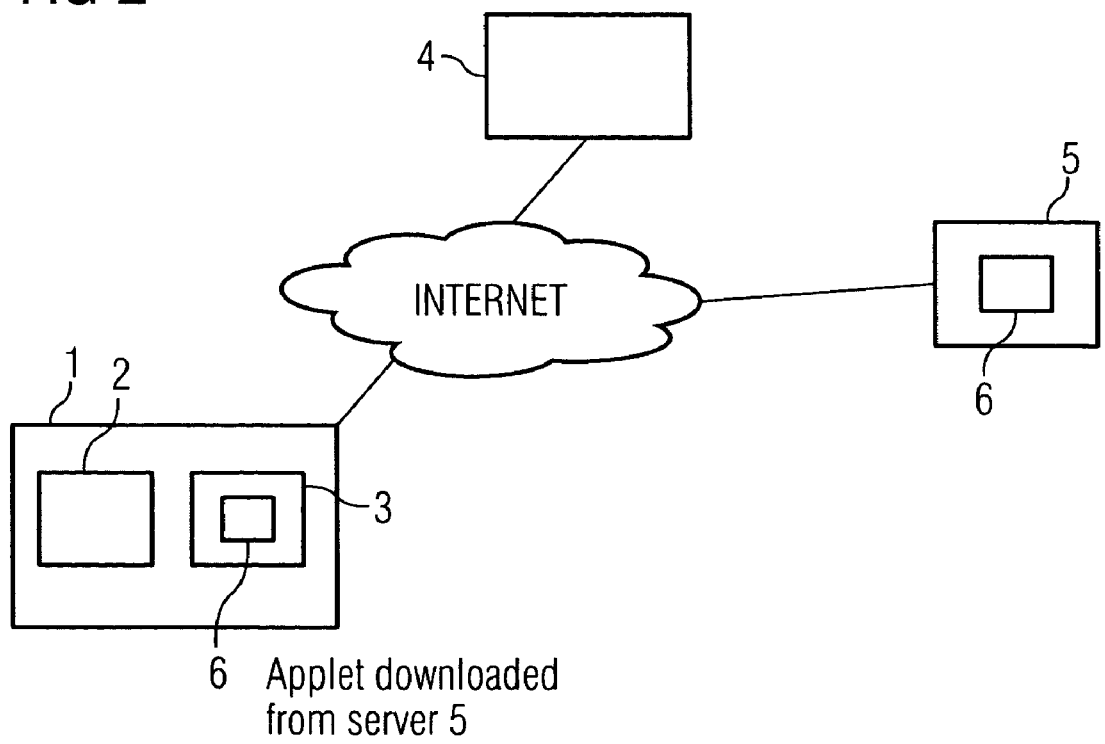
FIG. 2 illustrates a communications network.

A scenario exemplifying an embodiment of the invention is now described with reference to FIG. 2 of the accompanying drawings. FIG. 2 again illustrates a public PC 1, located for example in an Internet café. The PC 1 again comprises a hard disc 2 and is provided with a web browser 3. A legitimate user (not shown) enters the Internet café and is allocated the PC 1 to use. The user again wishes to make an online purchase of books from the bookshopontheInternet.com web site on the server 4.

The user launches the web browser 3 but rather than immediately accessing the bookshopontheInternet.com web site on the server 4, the user first inputs into the web browser 3 the URL of a trusted web site located on a second server 5, and downloads from the site a trusted secure web browser 6. The secure web browser 6 has been configured to browse the Internet without caching or otherwise storing data on the hard disc In this preferred embodiment, the secure web browser 6 is a Java applet.

The web browser 3 retrieves the secure web browser 6 and runs it, displaying the secure web browser 6 within the main window of the web browser 3. As per normal, the web browser 3 stores the URL of the visited web page in the browser history file on the hard disc 2. The web browser 3 also stores the secure web browser 6 on the hard disc 2.

Next, the user inputs the URL of the bookshopontheInternet.com home page into the secure web browser 6 which is now running within the web browser 3. The secure web browser 6 retrieves the bookshopontheInternet.com home page from the server 4 and displays the page to the user. The configuration of the secure web browser 6 ensures that neither the URL of the bookshopontheInternet.com home page nor the home page itself are stored on the hard disc 2.

Next, to access the user's account, the user inputs the registered account username and password to the secure web browser 6 to transmit this information to the server 4. The configuration of the secure web browser 6 ensures that this information is not stored on the hard disc 2.

After selecting one or more books for purchase, the user uses the secure web browser 6 to download and display a checkout page which prompts the user to input his or her credit card details to complete the transaction. The user inputs his or her credit card details into a form in the checkout page and causes the secure web browser 6 to transmit this information to the web server 4. Again, the secure web browser 6 does not store this information to a file on the hard disc 2.

The user completes his or her web browsing and exits the Internet café safe in the knowledge that the URLs of the visited web pages, the web pages themselves, the user name, password, and credit card details have not been saved to the hard disc 2.

If a fraudster were to be subsequently allocated the same PC and were to browse the hard disc 2 for information stored from the user's browsing session, the only information that they could find would be the user visited a web page on the server 6 and downloaded a Java web browser applet.

As is well known, in built security features of Java applets ensure that an applet can only directly communicate with the web server it was downloaded from. Therefore, in the above described embodiment, to enable internet wide access, the second server 5 must act as a web proxy server on behalf of the secure web browser 6 running on the PC 1. Alternatively, the secure web browser may promote its own security settings by first asking the user if he or she trust the applet. This would then allow the applet to enable Internet wide access without a web server proxy.

In other embodiments, the secure web browser 6 may only need to communicate with the site it was downloaded from and not with the Internet at large. For example, the secure web browser may be downloaded from a site operated by an Internet bank and may only be used to communicate with that bank's web site.

To prevent the need to download the secure browser multiple times every time a new site is visited a core Java applet web browser may be downloaded from one site and Internet enabling plugins from other sites. The use of a Proxy would allow other traffic than web to be accessible from within the main browser.

To minimise the time taken to download the secure web browser, modular components of the browser could be downloaded on a need to use basis. So for example, a plug in to render a .GIF format image would not be downloaded until such an image needed to be displayed.

The secure web browser must follow good practice for security software. Volatile memory, for example RAM, can be interrogated. Therefore the secure web browser does not store data in RAM for longer than is operationally necessary and such data is disposed of by overwriting, rather than simply returning it to the system pool. If necessary all other data could be stored in encrypted format in RAM.

As part of the download procedure or to verify the authenticity and integrity of a previously installed secure web browser on a public terminal, the applet could be digitally signed.

A system embodying the invention is illustrated in more detail in FIG. 3. To disable Java virtual Machine (JVM) image caching, the secure web browser 6 changes the JVM settings through a 'hidden' class available in the JVM 7.

Access rights under Java are controlled by a security manager as provided by the JVM 7. The secure web browser 6 has a security manager 8 with hard'disc access in the JVM 7 disabled.

As is known, Java applets use a standard browser application interface to request and send web pages. This has the disadvantage that the web browser within which the applet is running can still 'see' web pages that are going to the applet. A standard web browser would 'hijack' cookie requests in certain circumstances and place the cookie(s) in the hard disc cache.

To prevent this happening, the secure web browser 6 uses its own HTTP application library 9 which is downloaded as part of the secure web browser 6, rather than using that provided by the web browser application 3 interface.

The previously mentioned measures prevent explicit application level caching and writing of information to hard dis2 2. However, most modern operating systems use a swap file or partition. This is an area of hard disc that the operating system uses as RAM. When an application in physical RAM has not been used for some time it may get swapped to hard disc, leaving the quicker physical RAM for applications that the user is currently interacting with.

Of course, if the secure web browser 6 were to get swapped to hard disc it may be subject to similar attacks that are used to undelete cached information in the simply browser case, though the data will not be as human readable in the applet browser case.

To circumvent this, the user could be prompted to repeatedly interact with the secure web browser 6 to prevent the operating system marking the secure web browser 6 as not in current use and swapping to hard disc. Alternatively, the secure web browser 6 could run a small process to simulate user interaction. However in both instances, the operating system could still swap out the browser to hard disc, especially if it is heavily loaded.

To reduce the risk of compromise if this occurs, the secure web browser 6 only keeps internal variables active for the operational duration required. When a variable has been finished with, the values of that variable are overwritten with all 1's. This means that the time window in which a variable holds a valid value is as small as possible thus reducing the probability of it being swapped out to hard disc. It also means that if another application were to be allocated memory previously used by secure web browser 6 the contents have been set to all 1's so no information can be determined.

The actual object instruction code of the secure web browser 6 may reveal information or allow a fraudster to analyse and circumvent some of the above described measures. To reduce this risk, the secure web browser 6 preferably uses obfuscated object code. Thus for example, if a function in the secure web browser 6 is called "StoreCookieToMemory" thus giving the attacker a clue as to what the function does, it is replaced at compile time with a function name such as "ab". This also has the added benefit of reducing the size of the secure web browser 6 thus speeding up the download time.

To address the issue of keyboard 10 and mouse 11 logging Trojans 12, preferably, the secure web browser 6 provides a pop-up virtual keyboard 13 that serves as a data input means. By selecting an appropriate icon, the user causes the virtual keyboard 13 to be displayed on the PC's monitor (not shown) in a separate window. By using the mouse 11 to select each letter on this graphical keyboard 13, the letters are automatically entered into text fields (such as a password box) in the Java web browser's window.

This prevents the possibility of keyboard logging, because the user is no longer using the keyboard 10 for data input. In the event of there being a mouse logger, it may be possible for a fraudster to analyse the mouse cursor positioning in relation to the virtual keyboard 13 to determine the virtual keys that were clicked by the user.

Figure 4A:
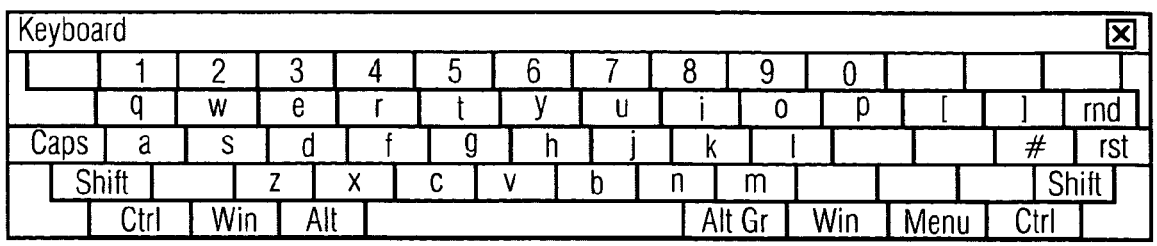
FIG. 4 illustrates a virtual keyboard.
Figure 4B:
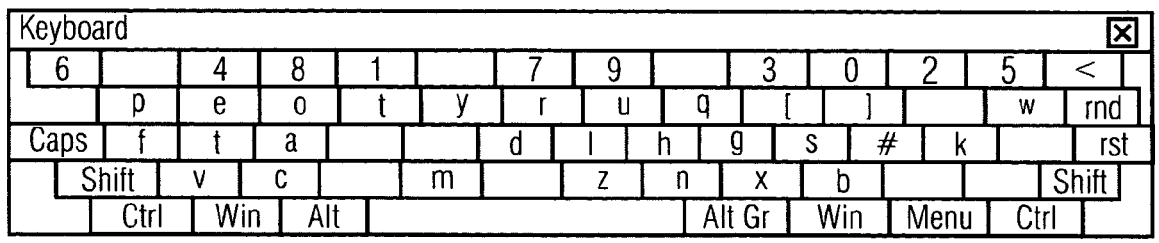

To prevent this possibility, preferably, the virtual keyboard 13 is provided with a randomise function, whereby a user clicks on a particular button in the display and in response, the layout of the keys in each row of the keyboard is randomised. This approach provides sufficient randomisation to make successful mouse logging difficult, but without greatly increasing the time taken for a user to locate desired keys. In response to a user clicking a reset button the keyboard is returned to a standard layout. An illustration of the virtual keyboard 13 in standard layout is illustrated in FIG. 4a and in a randomised layout in FIG. 4b.

Figure 5:
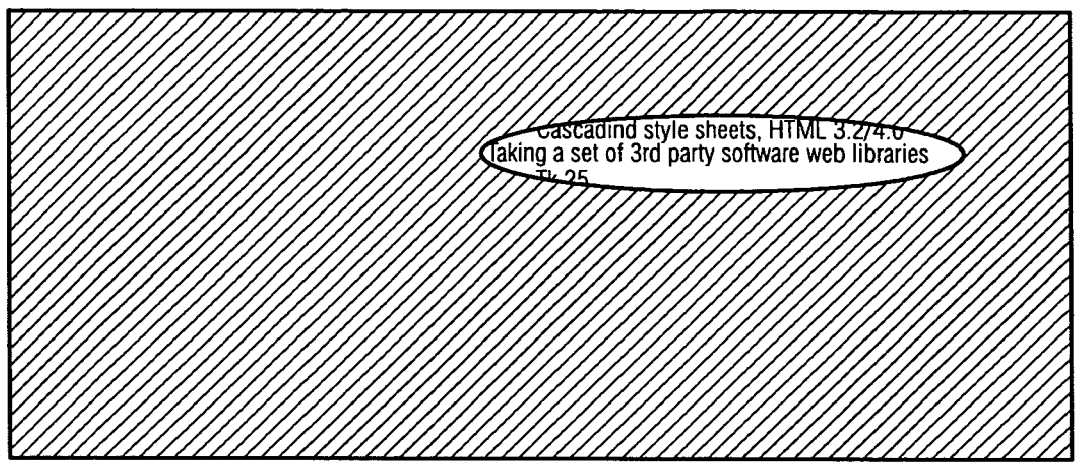
FIG. 5 illustrates a screen display.

Currently, there are also Trojans available that are able to take a single snap shot of a remote PC's screen and transmit the snap shot to a fraudster's PC. To reduce the probability of this type of attack being successful the secure web browser 6 may be provided with a 'peephole' viewer functionality, as illustrated in FIG. 5, whereby the user moves a transparent window over the part of the screen they are viewing, leaving the rest of the screen obscured, thus providing only a small amount of information at any one time that may be snap shot by a Trojan.

Figure 6:
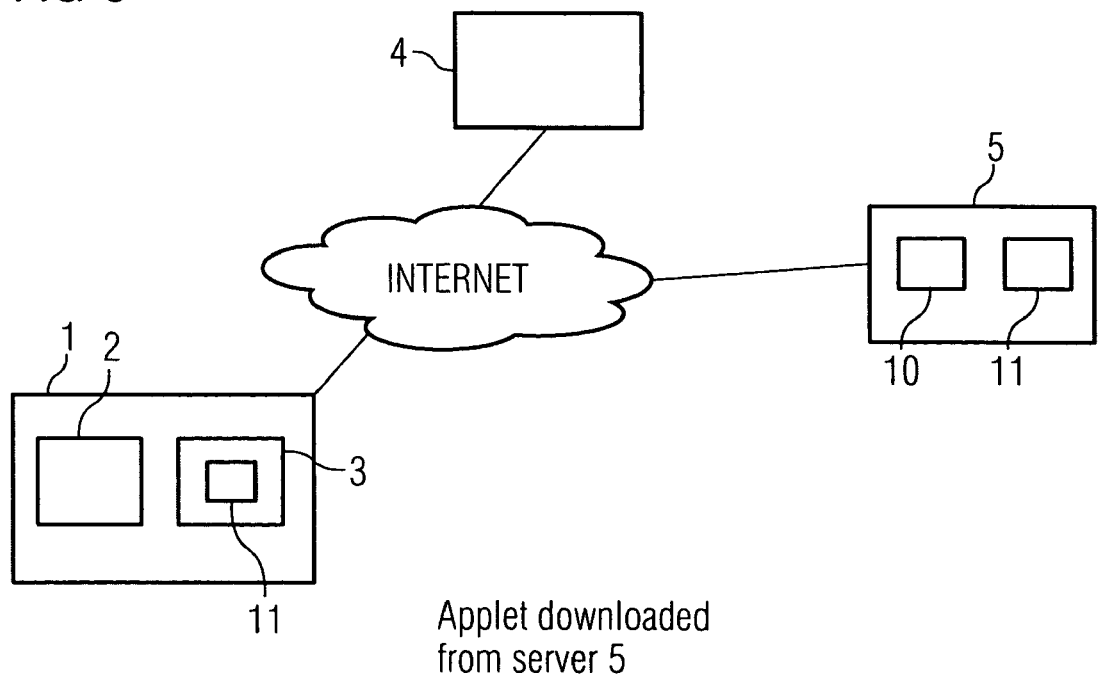
FIG. 6 illustrates a communications network.

In the above described embodiments, the user downloads a Java web browser applet to the PC 1. In an alternative embodiment illustrated schematically in FIG. 6, a user of the public PC 1 communicates with a server side web browser 10 running on the trusted server 5, and the display of the server side web browser is echoed back to the public PC 1. In detail, the user of the PC 1 uses the standard web browser 3 running on the PC 1 to download a Java applet 11 from the trusted server 5. This Java applet 11 is similar to the Java applet web browser 6 described above in that it is securely written to not require access to the hard disc and not to cache information. However, the Java applet 11 is not in itself a browser. The user uses the Java applet 11 to communicate with a web browser process 10 running on the trusted server 5. Each key press or mouse movement made by the user is sent to this web browser process 10. The web browser process interprets these actions within the context of a web browser. For example, if the user types in the URL http:www.RokeManor.co.uk in the Java applet 11, this text is sent to the trusted server 5 and the server 5 inputs the text to its web browser process 10 which retrieves the web page of the URL. The web page is then sent in graphical format, i.e. not in Hyper Text Mark up Language (HTML) to the Java applet 11 which displays it. As the graphical image is sent to the Java applet 11 and not to the web browser 3 no caching of the image occurs. Furthermore, as the URL was typed in the Java applet 11 and not the web browser 3 it also is not cached.

Thus, using the same book buying example as above, a user launches the web browser 3 and inputs into the web browser 3 the URL of the trusted web site located on the second server 5, and downloads from the site the Java applet 11. The web browser 3 retrieves the Java applet 11 and runs it, displaying the Java applet 11 within the main window of the web browser 3. The web browser 3 stores the URL of the visited web page in the browser history file on the hard disc 2. The web browser 3 also stores the Java applet 11 on the hard disc 2.

The user keys the URL of the bookshopontheInternet.com home page into the Java applet 11 which is now running within the web browser 3. The Java applet 11 sends these keys presses to the web browser process 10. The web browser process 10 retrieves the bookshopontheInternet.com home page from the server 4, formats it graphically and sends it to the Java applet 11 running within the browser 3, which displays the graphic to the user. The configuration of the Java applet 11 ensures that neither the URL of the bookshopontheInternet.com home page nor the received graphic are stored on the hard disc 2.

To access the user's account, the user inputs the registered account username and password to the Java applet 11 which sends this information to the web browser process 10 which in turn transmits this information to the server 4. The configuration of the Java applet 11 ensures that this information is not stored on the hard disc 2.

After selecting one or more books for purchase, the user inputs his or her credit card details to the Java applet 11 which transmits this information to the web browser process 10, which transmits the information onwards to the web server 4. Again, the Java applet does not store this information to a file on the hard disc 2.

The user completes his or her web browsing and exits the Internet café safe in the knowledge that the URLs of the visited web pages, the web pages themselves, the user name, password and credit card details have not been saved to the hard disc 2.

If a fraudster were to be subsequently allocated the same PC and were to browse the hard disc 2 for information stored from the user's browsing session, the only information that they could find would be the user visited a web page on the server 6 and downloaded a Java applet.

Having thus described the present invention with reference to preferred embodiments it is to be well understood that the embodiments in question are exemplary only and that modifications and variations such as will occur to those possessed of appropriate knowledge and skills may be made without departure from the scope of the invention as set forth in the appended claims.

The invention claimed is:

1. A method of communicating over a public data network, the method comprising,
transmitting to a remote server on the network a request for web browsing software stored on the remote server to be downloaded to a terminal connected to the network;
receiving the web browsing software at the terminal; and
using the web browsing software which has been downloaded to the terminal to communicate from the terminal over the public data network; wherein, at least one of the following is true:
the web browsing software is configured such that user input data, which is input to the web browsing software by a user of the terminal, is transmitted into the network without storing a record of said input data at the terminal; and
data which are received from the network at the terminal by the web browsing software, at the request of the user, are presented to the user without storing a record of the data at the terminal.

2. A method according to claim 1, wherein the web browsing software is a Java Applet.

3. A method according to claim 1, wherein, the web browsing software is for communicating with web sites.

4. A method according to claim 1, wherein the web browsing software is downloaded by and runs within a further communications application provided on the terminal.

5. A method according to claim 4, wherein the further communications application is a Web Browser.

6. A method according to claim 1, wherein the web browsing software is arranged to communicate with the public data network via a Web Browser application running on a remote server.

7. A method according to claim 6 wherein the Web Browser application retrieves web pages from the network on behalf of the web browsing software, which receives the Web Pages in a non graphical format from the Web Browser application.

8. A method according to claim 1, wherein no copy of the data transmitted into the network or the data received from the network by the application is cached at the terminal or written to permanent memory at the terminal.

9. A method according to claim 1, wherein no record of a network address visited by the application from the terminal is stored at the terminal.

10. A method according to claim 9 wherein the network address is any of an IP address, domain name or a URL.

11. A server connected to a public data network, the server storing a communications application for downloading to a terminal connected to the network for use in the method of claim 1.

* * * * *